US009821178B2

(12) United States Patent
Casebolt

(10) Patent No.: US 9,821,178 B2
(45) Date of Patent: Nov. 21, 2017

(54) BRACKET ASSEMBLY

(71) Applicant: D B Industries, LLC, Red Wing, MN (US)

(72) Inventor: Scott C. Casebolt, St. Paul Park, MN (US)

(73) Assignee: D B Industries, LLC, Red Wing, MN (US)

( * ) Notice: Subject to any disclaimer, the term of this patent is extended or adjusted under 35 U.S.C. 154(b) by 1117 days.

(21) Appl. No.: 13/827,098

(22) Filed: Mar. 14, 2013

(65) Prior Publication Data
US 2014/0227022 A1 Aug. 14, 2014

Related U.S. Application Data

(60) Provisional application No. 61/762,482, filed on Feb. 8, 2013.

(51) Int. Cl.
*F16D 3/00* (2006.01)
*A62B 35/04* (2006.01)
(Continued)

(52) U.S. Cl.
CPC .......... *A62B 35/04* (2013.01); *A62B 35/0025* (2013.01); *A62B 35/0037* (2013.01);
(Continued)

(58) Field of Classification Search
CPC ........... Y10T 403/32; Y10T 403/32041; A62B 35/0025; A62B 35/0037; A62B 35/0075;
(Continued)

(56) References Cited

U.S. PATENT DOCUMENTS 5,219,039 A * 6/1993 Bell ..................... E04G 21/3261
182/112
5,361,867 A * 11/1994 Olson ..................... F16F 7/123
116/203
(Continued)

FOREIGN PATENT DOCUMENTS

DE 3300266 7/1984
GB 2466460 6/2010
(Continued)

OTHER PUBLICATIONS

Requirement for Restriction/Election for U.S. Appl. No. 13/826,876 dated May 5, 2014 (6 pages).
(Continued)

*Primary Examiner* — Abigail Troy
*Assistant Examiner* — Nahid Amiri
(74) *Attorney, Agent, or Firm* — Dicke, Billig & Czaja, PLLC

(57) ABSTRACT

A bracket assembly includes a first flange portion with a first flange aperture. A swivel portion has first and second leg portions, each with an aperture, extending outward from a second flange portion with an aperture. The first and second leg portions define a first opening that receives the first flange portion. The first flange aperture, the first leg aperture, and the second leg aperture align and the first fastener extends therethrough. The swivel portion pivots about the first fastener in a first direction. A connector has first and second prongs, each with an aperture, defining a second opening that receives the second flange portion. The first prong aperture, the second prong aperture, and the second flange aperture align and the second fastener extends therethrough. The connector pivots about the second fastener in a second direction opposite the first direction.

11 Claims, 18 Drawing Sheets

(51) Int. Cl.
*F16F 7/00* (2006.01)
*A62B 35/00* (2006.01)
*F16C 11/04* (2006.01)
*F16B 45/04* (2006.01)

(52) U.S. Cl.
CPC .......... *A62B 35/0075* (2013.01); *F16B 45/04* (2013.01); *F16C 11/04* (2013.01); *F16F 7/006* (2013.01); *Y10T 403/32041* (2015.01)

(58) Field of Classification Search
CPC .......... A62B 35/04; F16B 45/04; F16C 11/04; F16F 7/006
USPC ............................... 403/52, 57; 182/3, 5, 231
See application file for complete search history.

(56) References Cited

U.S. PATENT DOCUMENTS

| | | | | |
|---|---|---|---|---|
| 5,601,161 | A * | 2/1997 | Brigden | B66C 3/005 188/83 |
| 6,070,308 | A | 6/2000 | Rohlf | |
| 6,073,724 | A | 6/2000 | Wainer et al. | |
| 7,108,099 | B2 * | 9/2006 | Ador | A62B 1/14 182/192 |
| 8,251,176 | B2 * | 8/2012 | Meillet | A62B 1/08 182/230 |
| 8,276,712 | B2 * | 10/2012 | Smith | A62B 35/0037 119/796 |
| 8,424,638 | B1 | 4/2013 | Guthrie et al. | |
| 9,174,073 | B2 | 11/2015 | Casebolt | |
| 2001/0004431 | A1 | 6/2001 | Crorey et al. | |
| 2009/0211847 | A1 * | 8/2009 | Balquist | A62B 35/0093 182/231 |
| 2009/0255756 | A1 * | 10/2009 | Green | A62B 35/0012 182/3 |
| 2010/0025157 | A1 * | 2/2010 | Casebolt | A62B 35/0093 182/231 |
| 2010/0226748 | A1 * | 9/2010 | Wolner | A62B 35/0093 414/815 |
| 2012/0205478 | A1 | 8/2012 | Balquist | |
| 2013/0025968 | A1 | 1/2013 | Smith et al. | |
| 2013/0104351 | A1 | 5/2013 | Casebolt | |
| 2013/0105247 | A1 * | 5/2013 | Casebolt | A62B 1/10 182/241 |

FOREIGN PATENT DOCUMENTS

| | | |
|---|---|---|
| WO | 2007-0071418 A1 | 6/2007 |
| WO | 2012-045144 A1 | 4/2012 |
| WO | WO 2013/063384 | 5/2013 |

OTHER PUBLICATIONS

Non Final Rejection for U.S. Appl. No. 13/826,876 dated Aug. 5, 2014 (12 pages).
Notice of Allowance for U.S. Appl. No. 13/826,876 dated Jun. 24, 2015 (14 pages).
Requirement for Restriction/Election for U.S. Appl. No. 14/860,860 dated Dec. 15, 2016.
Non Final Rejection for U.S. Appl. No. 14/860,860 dated Apr. 19, 2017 (19 pages).
International Search Report and Written Opinion for PCT Application No. PCT/US2014/010060 dated Jul. 24, 2014 (9 pages).
PCT International Search Report for PCT/US2014/010074, dated Aug. 26, 2014, 4 pages, H. Tamme.

* cited by examiner

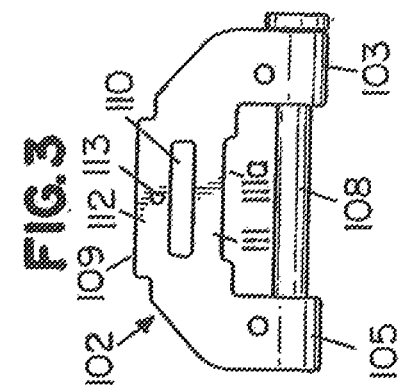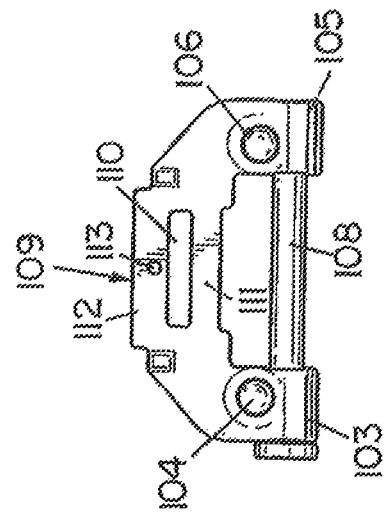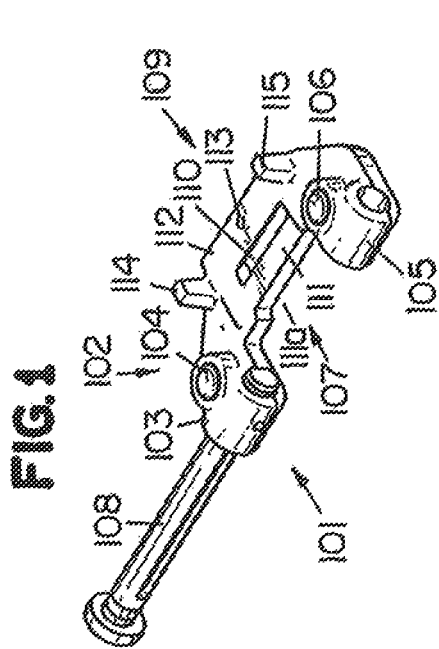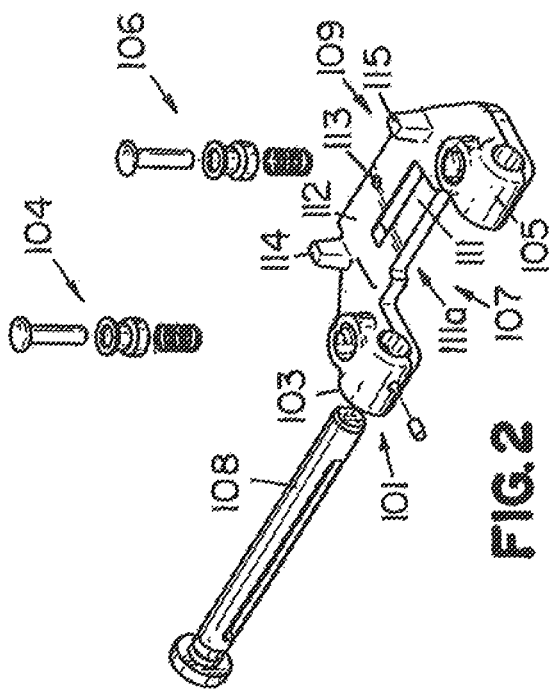

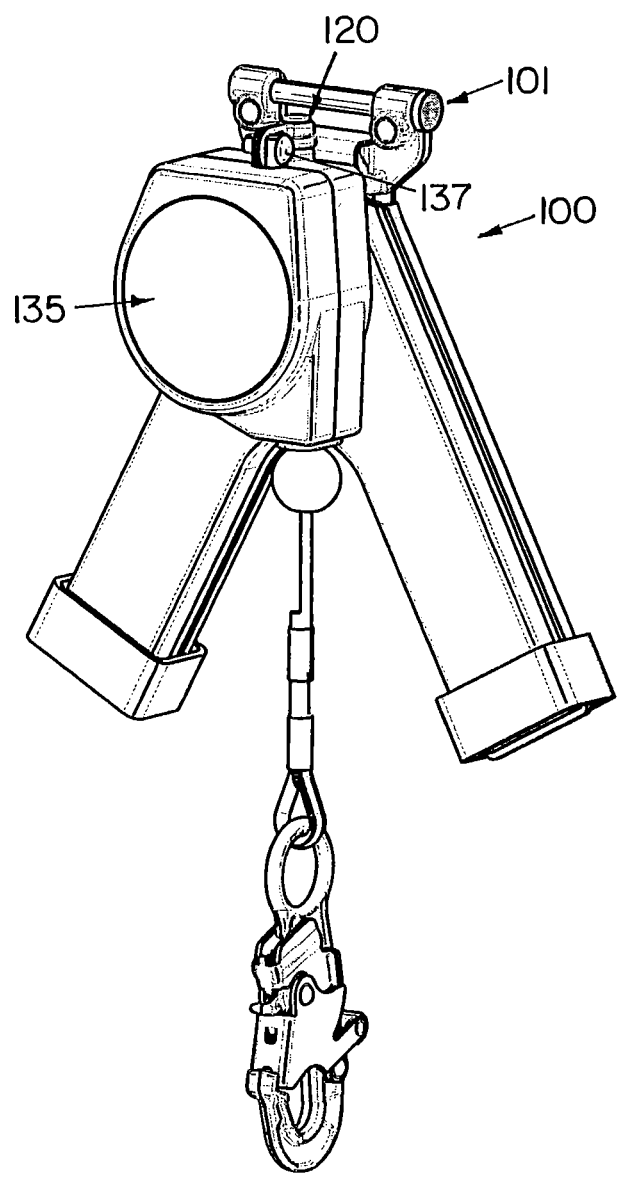

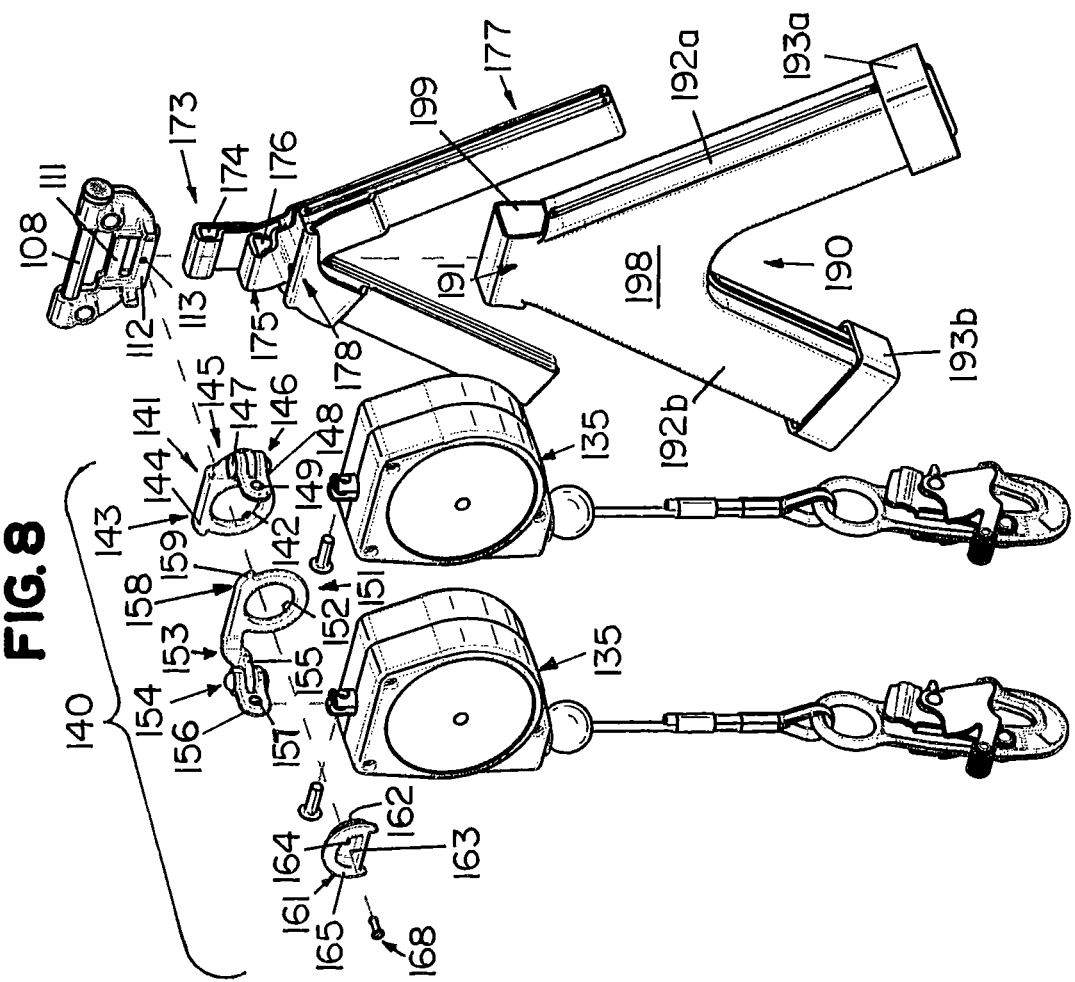
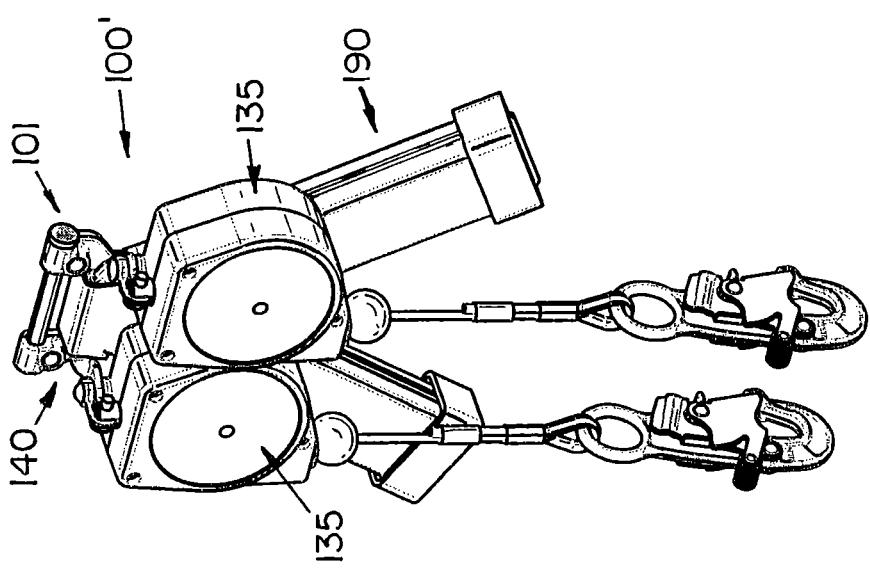

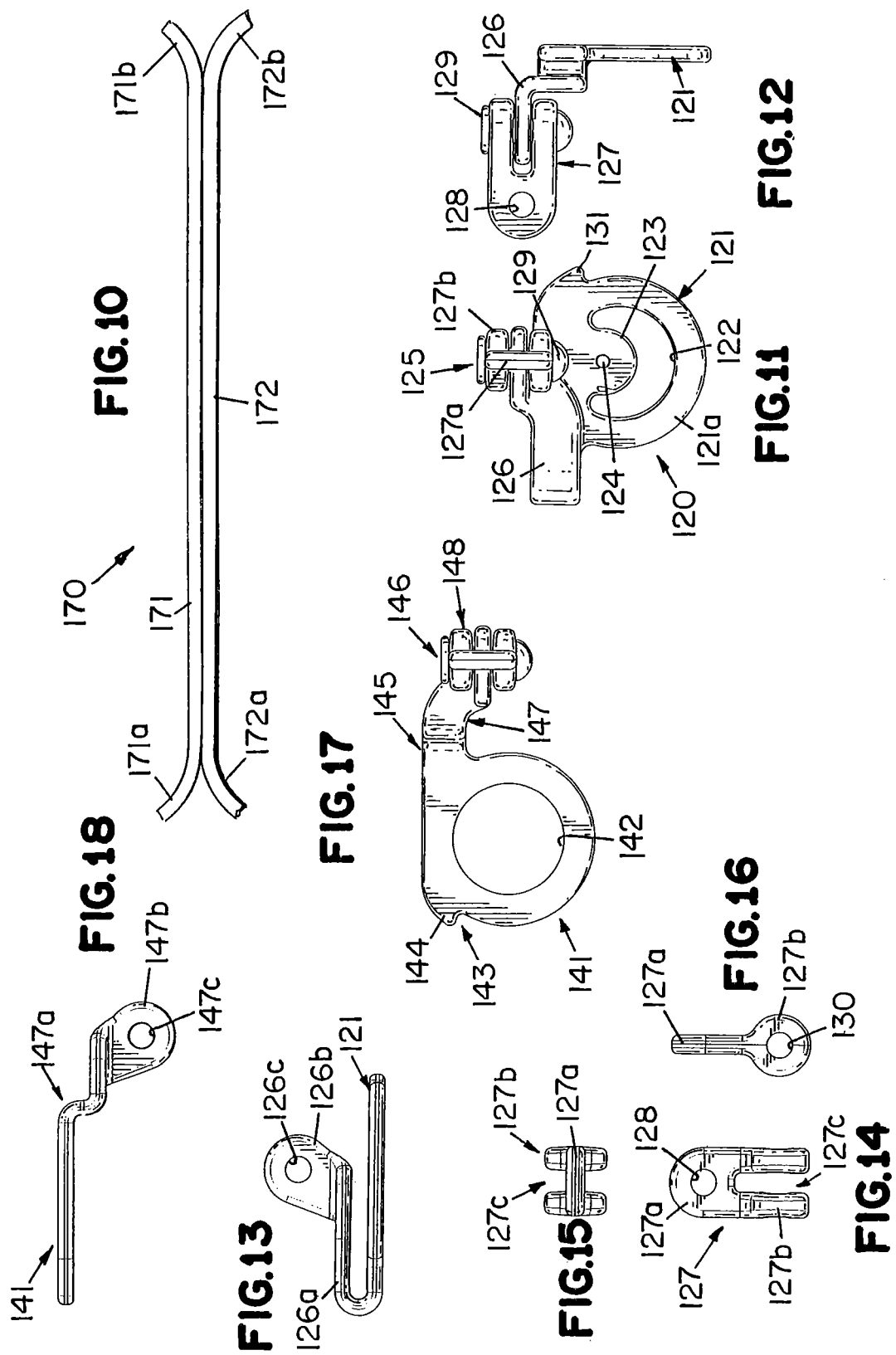

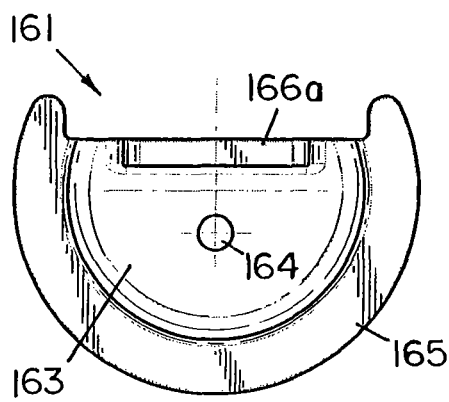
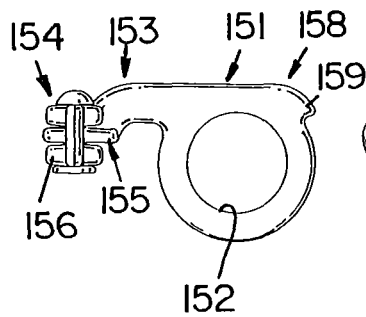
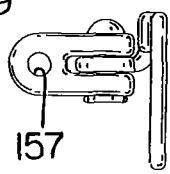
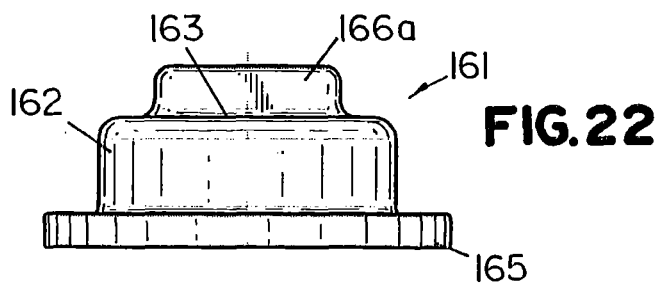
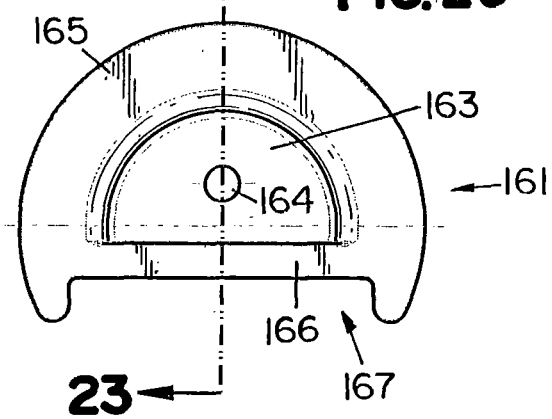
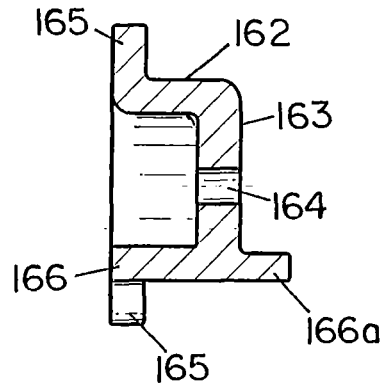
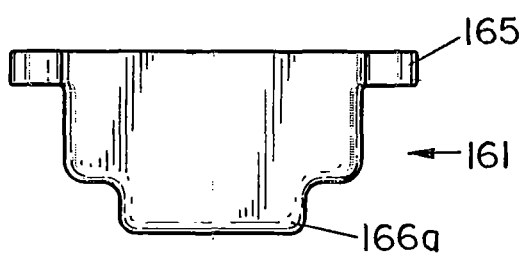
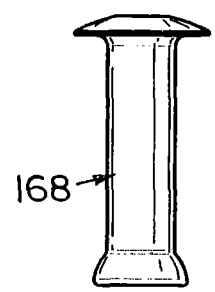

BRACKET ASSEMBLY

BACKGROUND OF THE INVENTION

To protect workers who work at heights or are at risk of falling distances, lifelines interconnecting support structures and safety harnesses donned by workers are commonly used. Examples of lifelines include but are not limited to self-retracting lifelines, lanyards, and other suitable lifelines. If a fall event occurs, the lifeline limits the distance the worker could fall.

Lifelines could interfere with the operation of such fall arrest equipment, especially if they are in positions where they could easily become tangled with safety harnesses, etc. Therefore, the present invention addresses such problems because it allows lifelines to swivel and reduce the risk of interfering with other components of the fall arrest equipment.

For the reasons stated above and for other reasons stated below, which will become apparent to those skilled in the art upon reading and understanding the present specification, there is a need in the art for a bracket assembly.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a bracket assembly comprises a first flange, a swivel portion, a first fastener, a safety device connector, and a second fastener. The first flange portion includes a first flange aperture. The swivel portion includes a first leg portion and a second leg portion extending outward from a second flange portion. The first leg portion has a first leg aperture, the second leg portion has a second leg aperture, and the second flange portion has a second flange aperture. The first leg portion and the second leg portion define a first opening therebetween. The first opening receives the first flange portion and the first flange aperture, the first leg aperture, and the second leg aperture align. The first fastener extends through the first flange aperture, the first leg aperture, and the second leg aperture. The swivel portion pivots about the first fastener in a first direction relative to the first flange portion. The safety device connector includes a safety device connector aperture. The second fastener extends through the safety device connector aperture and the second flange aperture. The safety device connector pivots about the second fastener in a second direction opposite the first direction relative to the second flange portion.

In one embodiment, a bracket assembly comprises a first flange portion, a swivel portion, a first fastener, a connector, and a second fastener. The first flange portion includes a first flange aperture. The swivel portion includes a first leg portion and a second leg portion extending outward from a second flange portion. The first leg portion has a first leg aperture, the second leg portion has a second leg aperture, and the second flange portion has a second flange aperture. The first leg portion and the second leg portion define a first opening therebetween. The first opening receives the first flange portion and the first flange aperture, the first leg aperture, and the second leg aperture align. The first fastener extends through the first flange aperture, the first leg aperture, and the second leg aperture, and the swivel portion pivots about the first fastener in a first direction relative to the first flange portion. The connector of a safety device has a first prong and a second prong defining a second opening therebetween. The first prong has a first prong aperture, and the second prong has a second prong aperture. The second opening receives the second flange portion and the first prong aperture, the second prong aperture, and the second flange aperture align. The second fastener extends through the first prong aperture, the second prong aperture, and the second flange aperture and the connector pivots about the second fastener in a second direction opposite the first direction relative to the second flange portion.

BRIEF DESCRIPTION OF THE DRAWINGS

The present invention can be more easily understood, and further advantages and uses thereof can be more readily apparent, when considered in view of the detailed description and the following Figures in which:

FIG. 1 is a front perspective view of a connector in an open position, the connector being a component of an energy absorber assembly constructed in accordance with the present invention;

FIG. 2 is an exploded front perspective view of the connector shown in FIG. 1;

FIG. 3 is a rear view of the connector shown in FIG. 1 in a closed position;

FIG. 4 is a front view of the connector shown in FIG. 1 in a closed position;

FIG. 5 is a front perspective view of an energy absorber assembly constructed in accordance with the present invention;

FIG. 7 is a front perspective view of another embodiment energy absorber assembly constructed in accordance with the present invention;

FIG. 8 is an exploded front perspective view of the energy absorber assembly shown in FIG. 7;

FIG. 10 is a schematic view of an energy absorber component of an energy absorber assembly constructed in accordance with the present invention;

FIG. 11 is a front view of a bracket assembly component of an energy absorber assembly constructed in accordance with the present invention;

FIG. 12 is a side view of the bracket assembly shown in FIG. 11;

FIG. 13 is a bottom view of base of the bracket assembly shown in FIG. 11;

FIG. 14 is a side view of a swivel portion of the bracket assembly shown in FIG. 11;

FIG. 15 is a front view of the swivel portion shown in FIG. 14;

FIG. 16 is a side view of the swivel portion rotated 90 degrees from that shown in FIG. 14;

FIG. 17 is a front view of a first base of another embodiment bracket assembly component of an energy absorber assembly constructed in accordance with the present invention;

FIG. 18 is a top view of the first base shown in FIG. 17;

FIG. 19A is a front view of a second base used with the first base shown in FIG. 17;

FIG. 19B is a side view of the second base shown in FIG. 19A;

FIG. 20 is a front view of a base connector for interconnecting the first base shown in FIG. 17 and the second base shown in FIG. 19A;

FIG. 21 is a bottom view of the base connector shown in FIG. 20;

FIG. 22 is a top view of the base connector shown in FIG. 20;

FIG. 23 is a cross-sectional view of the base connector taken along the lines 23-23 in FIG. 20;

FIG. 24 is a rear view of the base connector shown in FIG. 20;

FIG. 25 is a side view of a fastener used with the base connector shown in FIG. 20;

In accordance with common practice, the various described features are not drawn to scale but are drawn to emphasize specific features relevant to the present invention. Reference characters denote like elements throughout the Figures and the text.

DETAILED DESCRIPTION OF THE INVENTION

Figure 6:
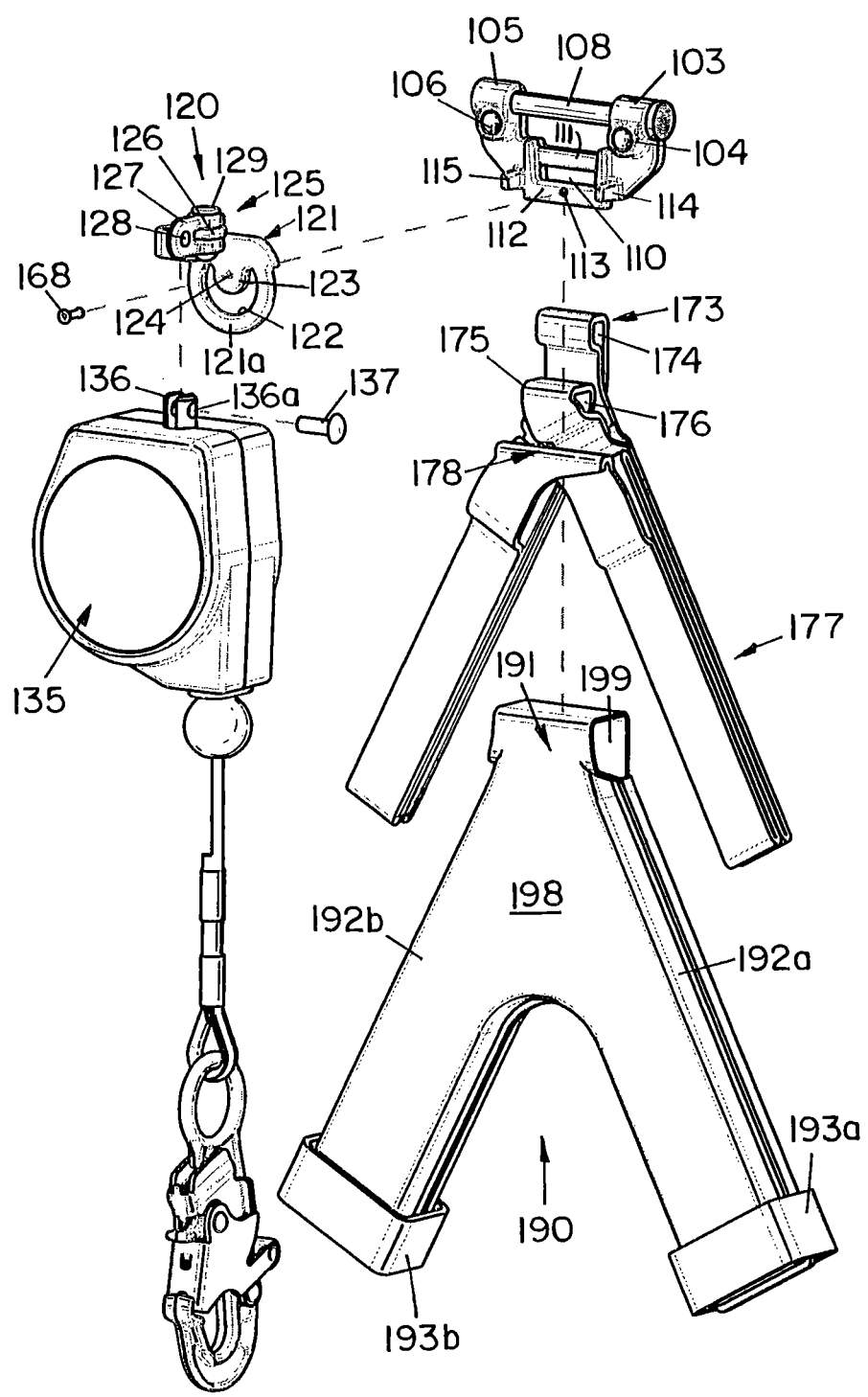
FIG. 6 is an exploded front perspective view of the energy absorber assembly shown in FIG. 5.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Embodiments of the present invention provide for an energy absorber assembly and components thereof.

One embodiment energy absorber assembly 100 includes a connector 101, a bracket assembly 120, an energy absorber 170, and a cover 190. Although shown with a self-retracting lifeline 135 operatively connected to the bracket assembly 120, it is recognized that any suitable type of lifeline could be used and operatively connected to the bracket assembly 120 with or without modifications to the bracket assembly.

The connector 101 is configured and arranged to operatively connect a safety harness, preferably proximate its dorsal D-ring as is well known in the art, the energy absorber 170, and the self-retracting lifeline 135 via the bracket assembly 120. Generally, as shown in at least FIGS. 1-4, the connector 101 includes a base 102, which is generally U-shaped with a first end 103, a second end 105, and an intermediate portion 109 interconnecting the ends 103 and 105. The ends 103 and 105 define an opening 107 therebetween. The first end 103 includes a first locking assembly 104 and the second end 105 includes a second locking assembly 106 configured and arranged to selectively engage a gate 108. The gate 108 extends through bores in the ends 103 and 105 and spans the opening 107 in a locked position, in which the locking assemblies 104 and 106 prevent the gate 108 from moving. In an unlocked position, in which the locking assemblies 104 and 106 are compressed, the gate 108 slides out of the bore in end 105 to allow access to the opening 107. The connector 101 is similar to that disclosed in U.S. patent application Ser. No. 13/660,532, which is hereby incorporated by reference in its entirety. This aspect of the connector 101 is described in detail in U.S. patent application Ser. No. 13/660,532.

The intermediate portion 109, which differs from the connector disclosed in U.S. patent application Ser. No. 13/660,532, includes a slot 110 forming a first bar portion 111 proximate the opening 107 and a second bar portion 112 opposite the ends 103 and 105. The first bar portion 111 includes a recessed portion 111a on a side proximate the ends 103 and 105, and the second bar portion 112 includes an aperture 113 proximate its center. A first protrusion 114 extends outwardly at approximately a right angle proximate the second bar portion 112 and the first side 103, and a second protrusion 115 extends outwardly at approximately a right angle proximate the second bar portion 112 and the second side 105.

In this embodiment, a bracket assembly 120 is used. As shown in at least FIGS. 5 and 6, the bracket assembly 120 includes a circular base 121 with a crescent shaped slot 122 proximate its bottom that forms a bar portion 121a proximate the bottom of the slot 122 and a tab portion 123 proximate the top of the slot 122. The tab portion 123 extends downward relative to the base 121 and includes an aperture 124. One side of the base 121 includes a swivel connector portion 125. The swivel connector portion 125 includes a stationary portion 126, a swivel portion 127, and a fastener 129 interconnecting the portions 126 and 127. The stationary portion 126 includes an extension arm 126a, which extends outward in a U-shaped manner from proximate the top of the base 121, and a flange 126b, which extends laterally outward from the extension arm 126a proximate the center top of the base 121 and includes and aperture 126c. This is shown in at least FIGS. 11-13. The swivel portion 127 includes a tab portion 127a and a two prong portion 127b, which includes two legs extending outward from the tab portion 127a at a distance from one another to form an opening 127c therebetween. The tab portion 127a includes an aperture 128 and the legs of the two prong portion 127b include aligning apertures 130. The opening 127c is configured and arranged to receive the flange 126b and the apertures 126c and 130 align. The base 121, including the stationary portion 126, and the swivel portion 127 are preferably made of alloy steel. The fastener 129, which could be a rivet as shown, extends through the apertures 126c and 130 to connect the stationary portion 126 and the swivel portion 127 in a manner that allows the swivel portion 127 to swivel or pivot relative to the stationary portion 126. The other side of the base 121, opposite the swivel portion 127, includes a shoulder portion 131 extending outward therefrom. A fastener 168, such as a rivet as shown, extends through the aperture 124 of the bracket assembly 120 and the aperture 113 of the connector 101. The bracket assembly 120 is pivotable about the fastener 168 relative to the connector 101, and the swivel connector portion 125 and the shoulder portion 131 contact the respective protrusions 114 and 115, which act likes stops to limit rotation of the bracket assembly 120. A lifeline, such as a self-retracting lifeline 135 including a connector portion 136, is operatively connected to the bracket assembly 120 by a fastener 137 extending through the aperture 128 of the swivel portion 127 and the apertures 136a of the connector portion 136.

This bracket assembly 120 provides a universal joint configuration allowing the lifeline to be orientated in many directions with little restriction. The swivel portion 127 pivots about the fastener 129 in a first direction relative to the flange 126b and the connector portion 136 of the lifeline 135 pivots about the fastener 137 in a second direction relative to the flange or tab portion 127a. The first direction and the second direction are generally opposite, and preferably the first direction and the second direction are perpendicular. In addition, the base 121 pivots about the fastener 168 to provide an additional pivot movement.

The energy absorber 170 includes a first portion 171 and a second portion 172 operatively connected by any suitable means well known in the art. One example of how the portions 171 and 172 could be connected is described in U.S. patent application Ser. No. 13/656,119 filed Oct. 19, 2012 and U.S. patent application Ser. No. 13/463,986 filed May 4, 2012, which are hereby incorporated by reference in their entirety. The energy absorber 170 is schematically illustrated in an unassembled position in FIG. 10. The first portion 171 has a first end 171a and a second end 171b, and the second portion 172 has a first end 172a and a second end 172b. The portions 171 and 172 are operatively connected proximate an intermediate portion 177 of the energy absorber 170. The first ends 171a and 172a are positioned proximate one another and the second ends 171b and 172b are positioned proximate one another.

To connect the energy absorber 170 to the connector 101, one of the first end 171a of the first portion 171 and the second end 172b of the second portion 172 is positioned proximate the recessed portion 111a of the first bar portion 111, the other of the first end 171a of the first portion 171 and the second end 172b of the second portion 172 is positioned proximate the slot 110, and the ends 171a and 172b are operatively connected, such as by stitching, as a first connection 173 to form a first loop 174 about the first bar portion 111.

To connect the energy absorber 170 to the bracket assembly 120, one of the second end 171b of the first portion 171 and the first end 172a of the second portion 172 is inserted through the slot 122 from one side of the base 121, the other of the second end 171b of the first portion 171 and the first end 172a of the second portion 172 is positioned proximate the other side of the base 121, and the ends 171b and 172a are operatively connected, such as by stitching, as a second connection 175 to form a second loop 176 about the bar portion 121a of the base 121.

Figure 30:
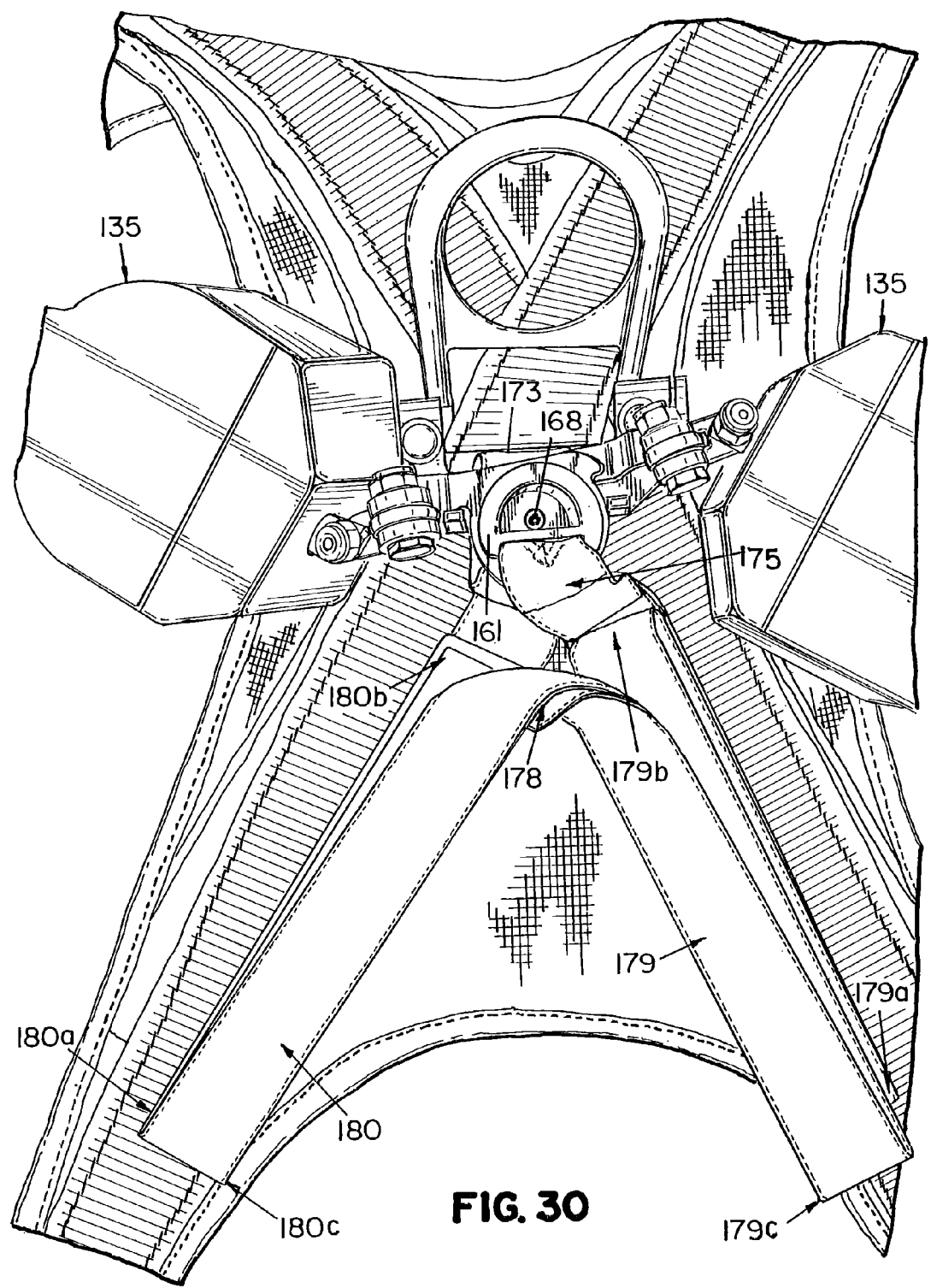
FIG. 30 is a front view of an energy absorber of the energy absorber assembly shown in FIG. 26.
Figure 31:
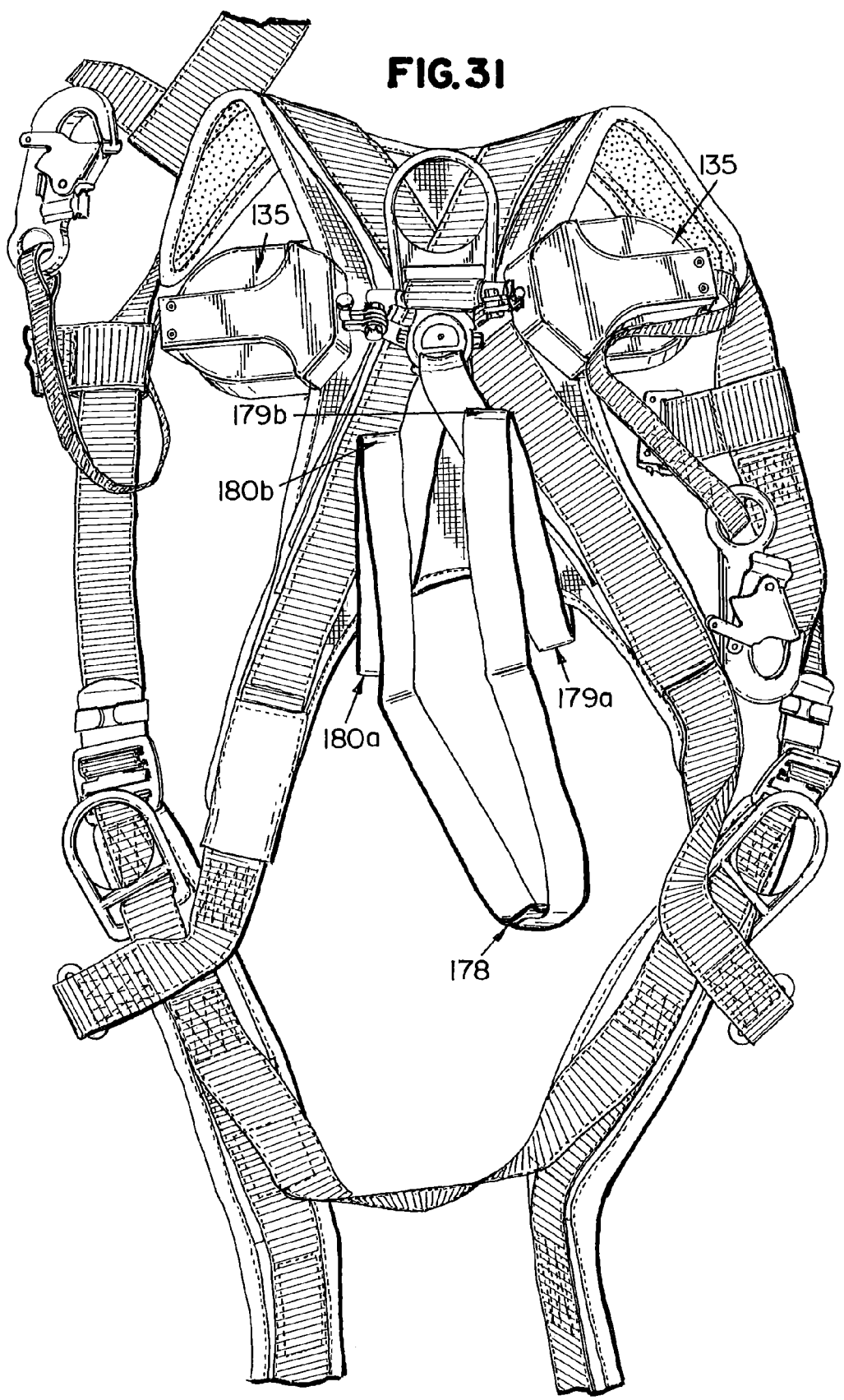
FIG. 31 is a front view of the energy absorber shown in FIG. 30 with an intermediate portion partially unfolded.
Figure 32:
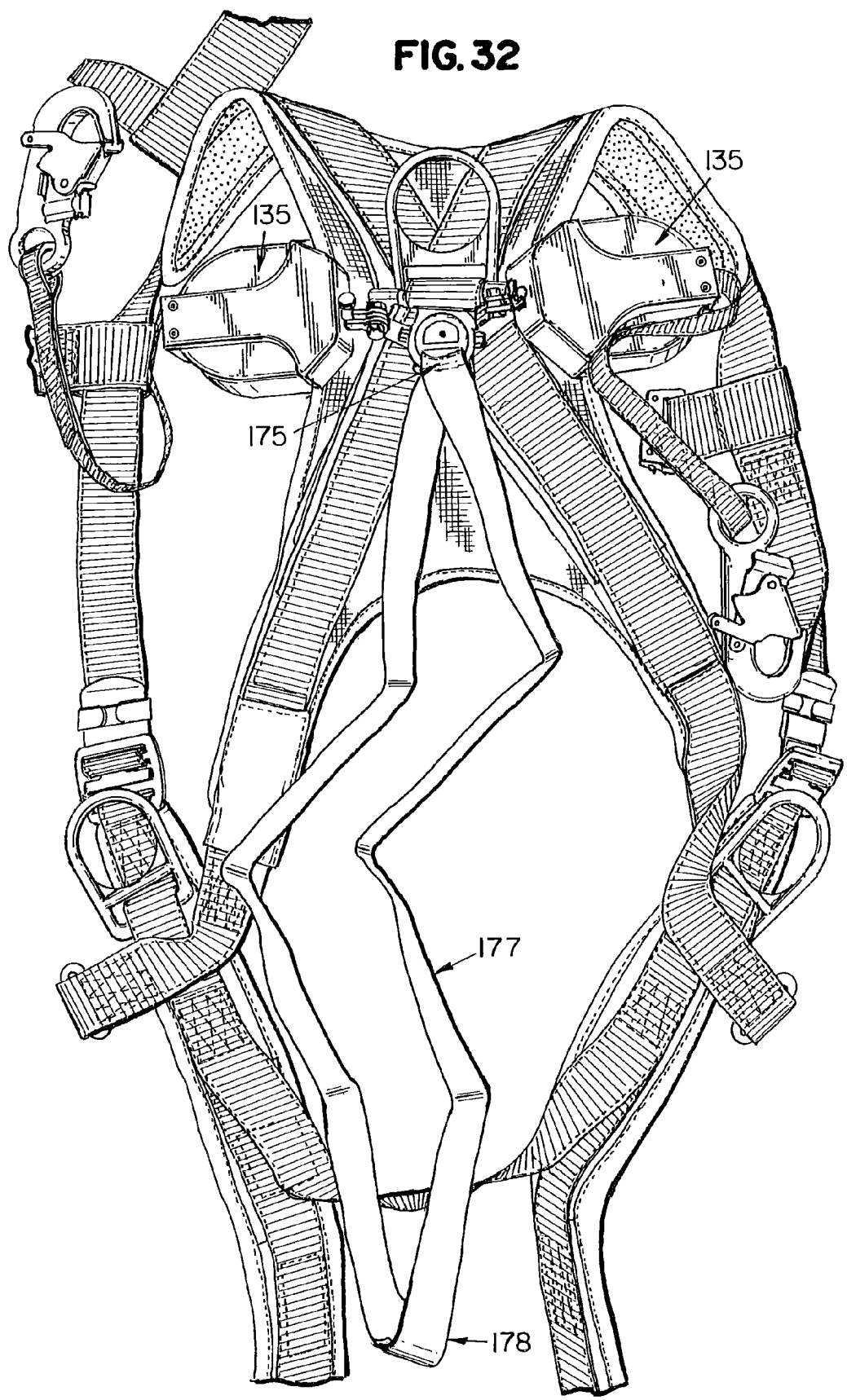
FIG. 32 is a front view of the energy absorber shown in FIG. 30 with the intermediate portion substantially unfolded.
Figure 33:
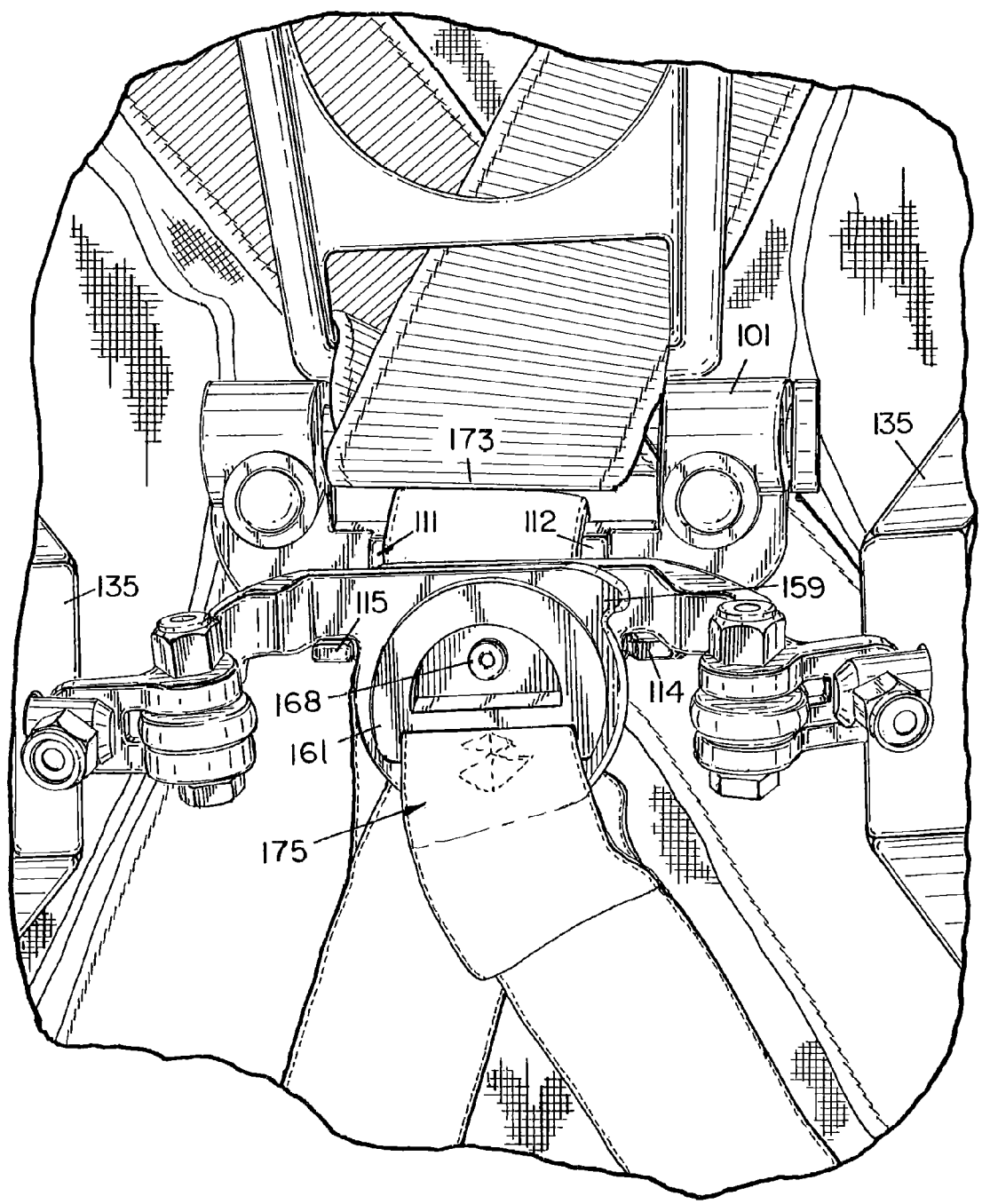
FIG. 33 is a front view of a bracket assembly of the energy absorber assembly shown in FIG. 26.
Figure 34:
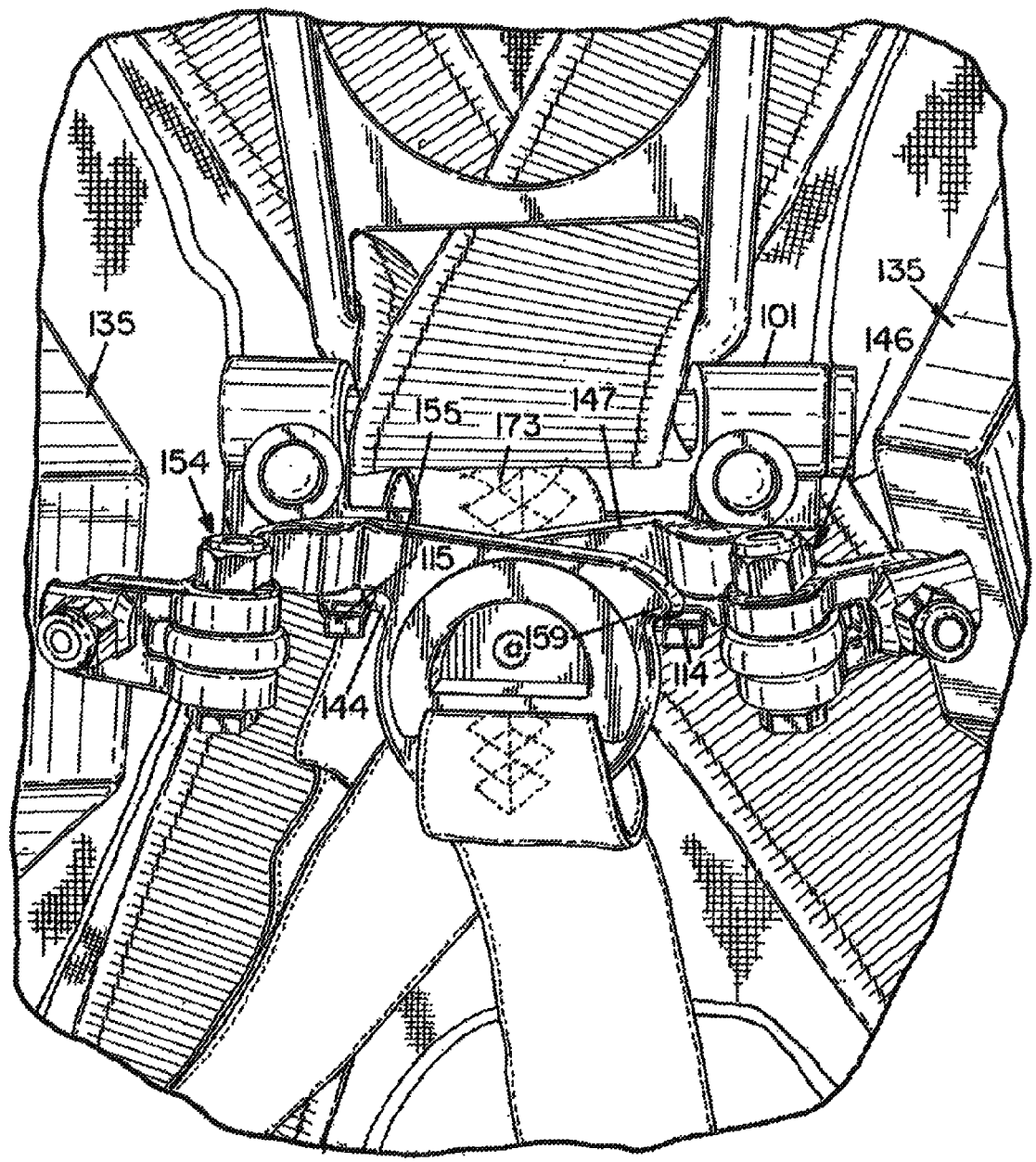
FIG. 34 is a front view of the bracket assembly shown in FIG. 33.
Figure 35:
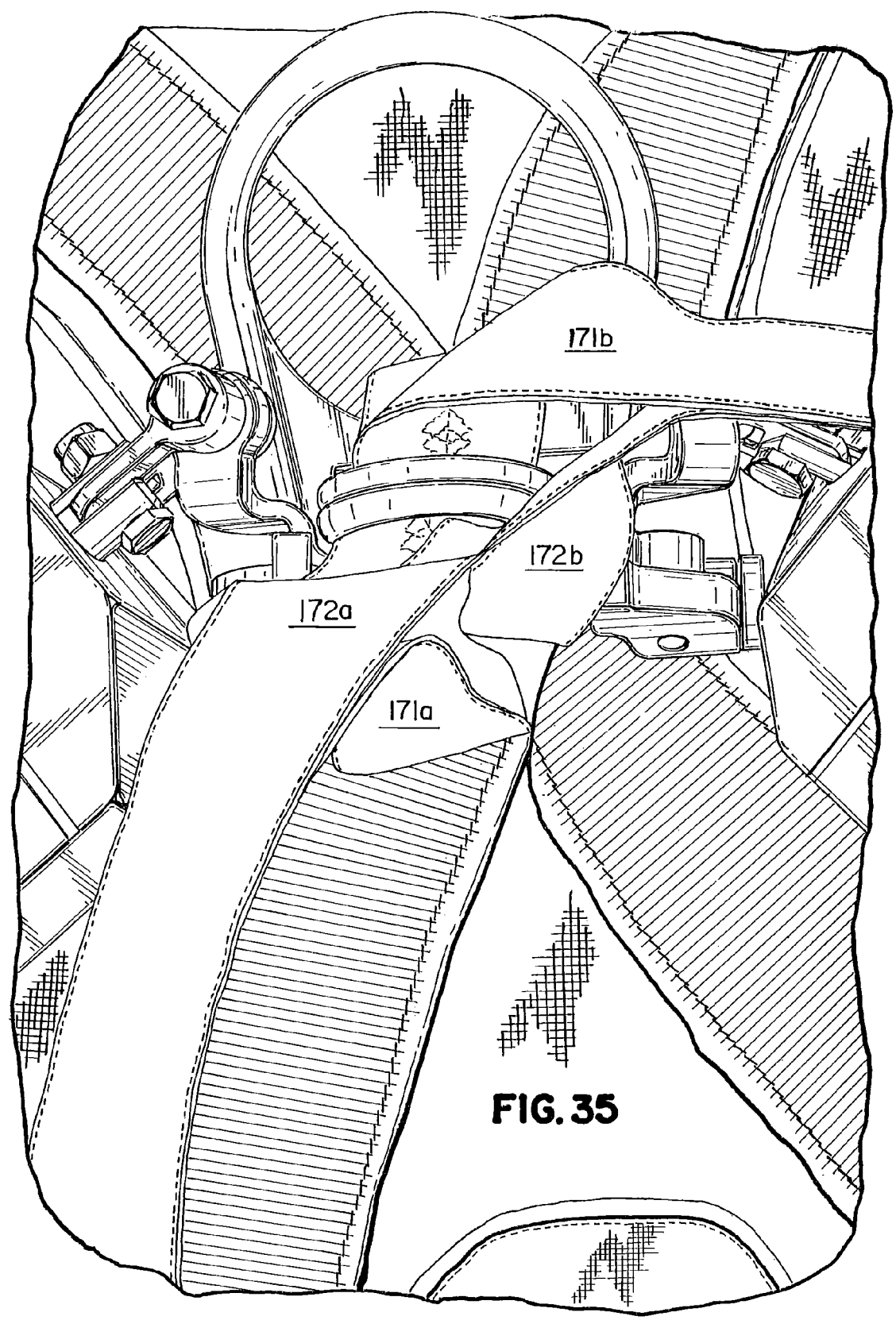
FIG. 35 is a bottom view of first and second bases of the bracket assembly shown in FIG. 33.
Figure 36:
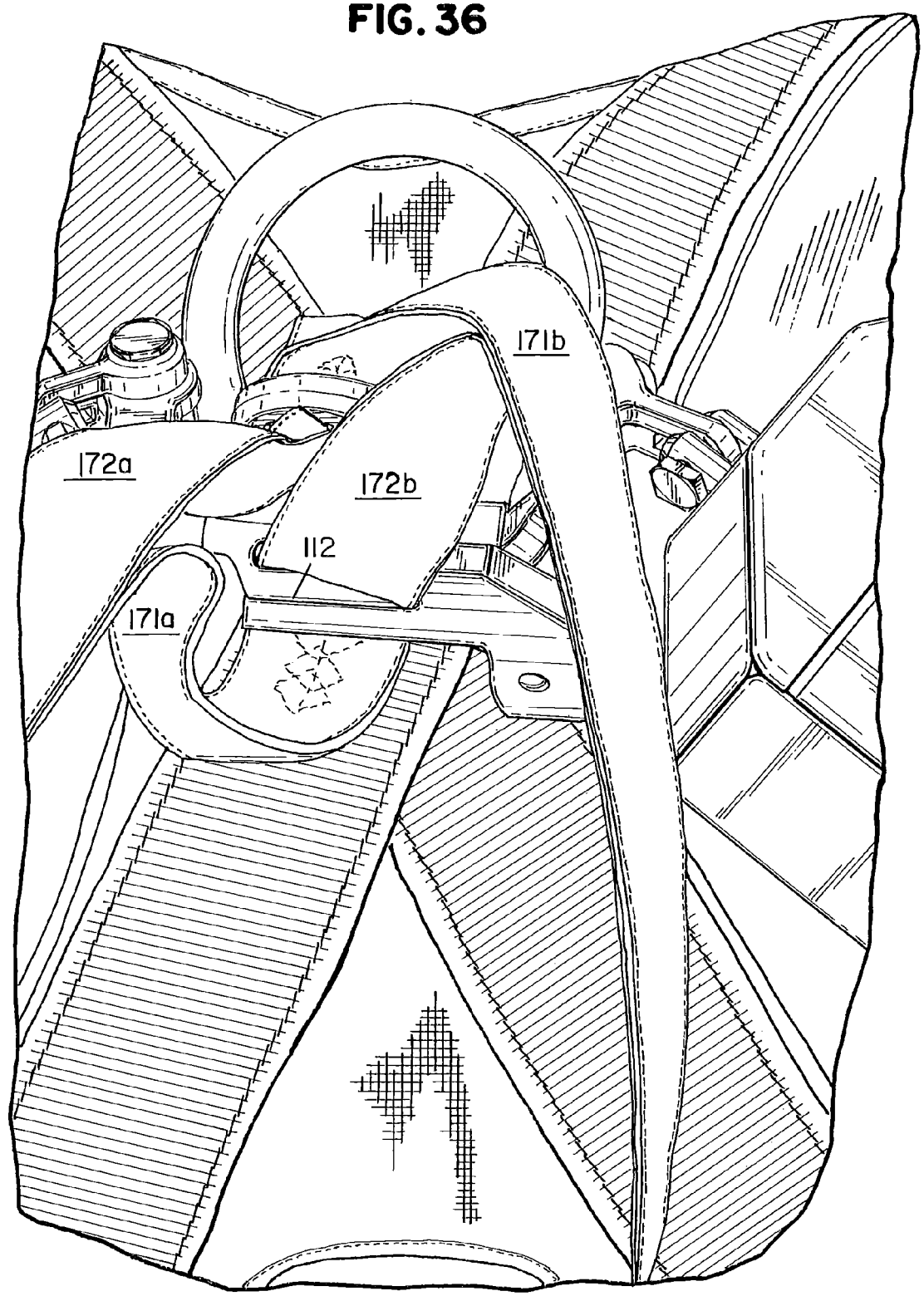
FIG. 36 is a bottom view of a connector of the energy absorber assembly shown in FIG. 26.
Figure 37:
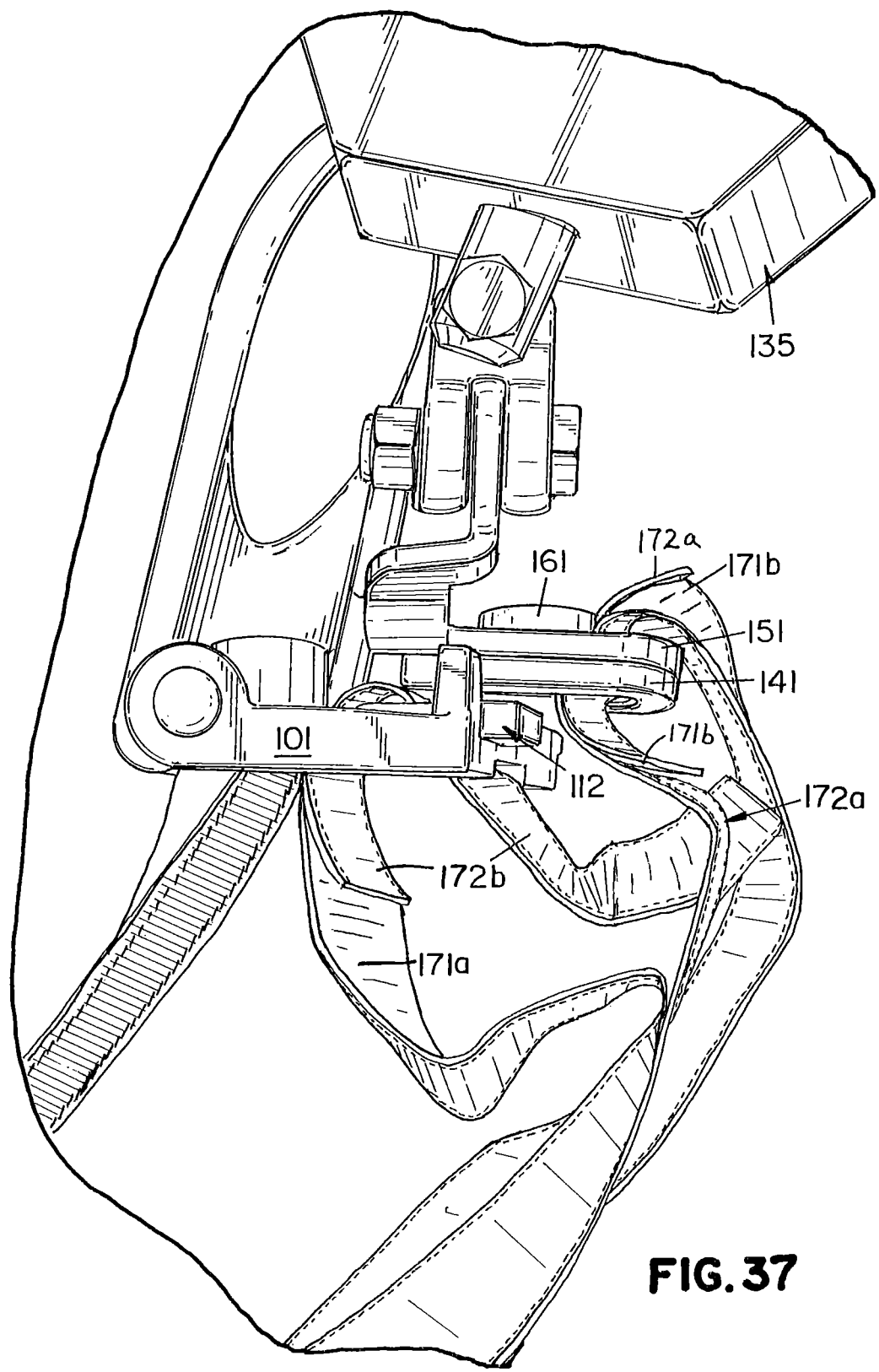
FIG. 37 is a side view of the energy absorber assembly with the cover removed to show how the energy absorber is connected to the connector and the bracket assembly.

After the energy absorber 170 is connected to the other components, it is folded to form an upside down V-shape, which corresponds to the shape of the shoulder straps of the safety harness. The energy absorber 170 includes a first side 179, a second side 180, and a bottom portion 178, which interconnects the sides 179 and 180. It does not matter on which sides of the safety harness the sides 179 and 180 of the energy absorber 170 are positioned. Generally, as shown in FIGS. 30-32, each side of the energy absorber 170 is folded three times so that each segment between folds is approximately the same length. The first side 179 includes a first fold 179a, a second fold 179b, and a third fold 179c. The second side 180 includes a first fold 180a, a second fold 180b, and a third fold 180c. The bottom portion 178 is positioned proximate the connections 173 and 175, which form the point of the "V". Once positioned in a folded configuration, a cover 190 can be positioned about the energy absorber 170 to assist in keeping it in its folded configuration.

As shown in at least FIGS. 26-29, the cover 190 is generally a sleeve having an upside down V-shaped configuration corresponding to the energy absorber 170 in its folded configuration. The cover 190 includes a top portion 191, a first leg 192a, and a second leg 192b. Proximate the bottom, the first leg 192a includes a first strap 193a with a first end 194a, a second end 196a, and a first fastener assembly 197a, which is configured and arranged to releasably connect the ends 194a and 196a. Proximate the bottom, the second leg 192b includes a second strap 193b with a first end 194b, a second end 196b, and a second fastener assembly 197b, which is configured and arranged to releasably connect the ends 194b and 196b. As shown, each of the fastener assemblies 197a and 197b includes mating hook and loop but it is recognized that other suitable fastener assemblies could be used to connect the respective ends.

Figure 28:
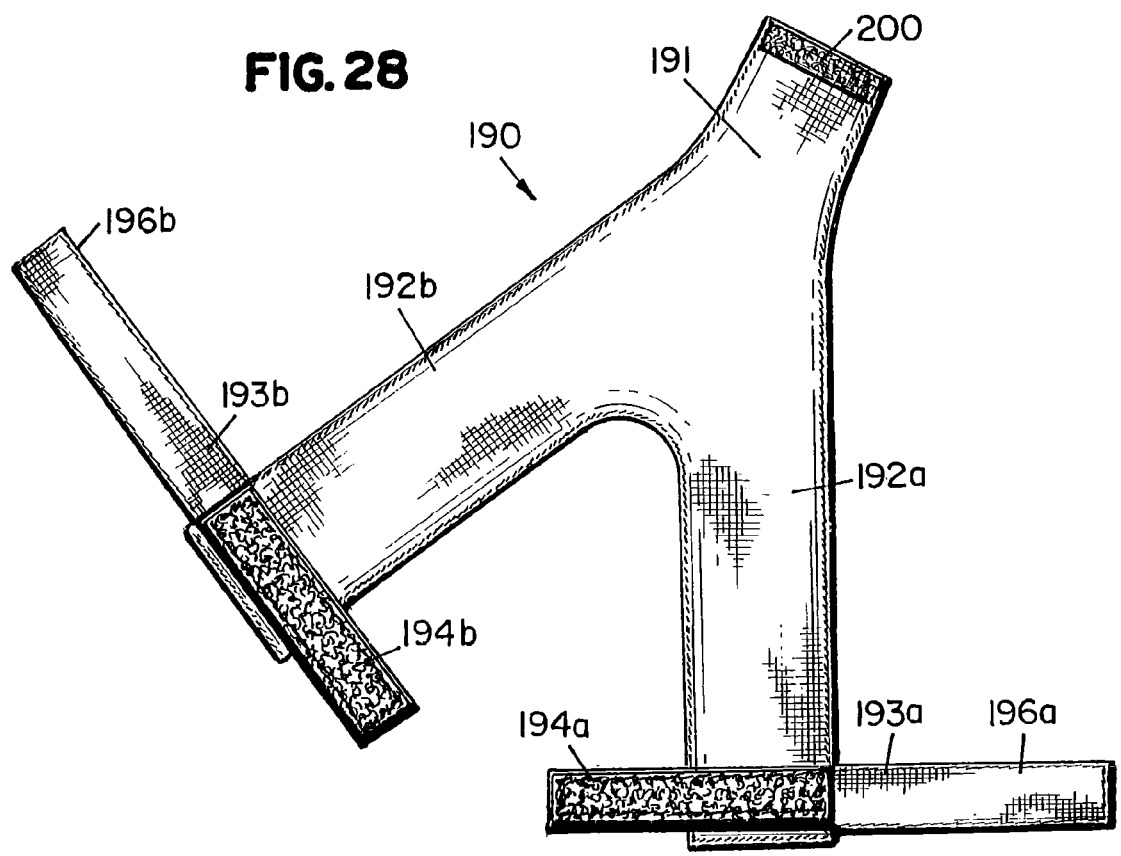
FIG. 28 is a front view of the cover shown in FIG. 27.
Figure 29:
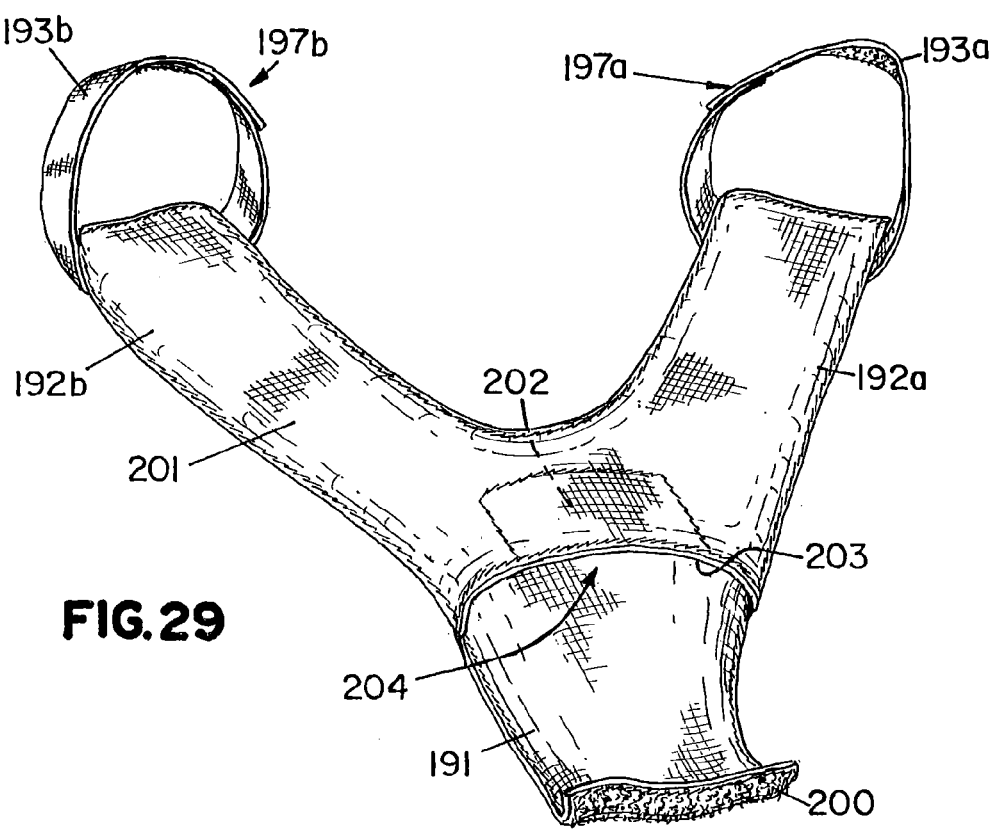
FIG. 29 is a rear view of the cover shown in FIG. 27.

The front side 198 of the cover 190 is shown in FIG. 28. A flap portion 199 extends upward from the top portion 191 and includes a first portion 200 of a fastener, for example one of mating hook and loop. The rear side 201 of the cover 190 is shown in FIG. 29. The top portion 191 includes an opening 203 between the front side 198 and the rear side 201, which form a cavity 204 therebetween. The rear side 201 includes a second portion 202 of the fastener, for example, the other of mating hook and loop.

Figure 26:
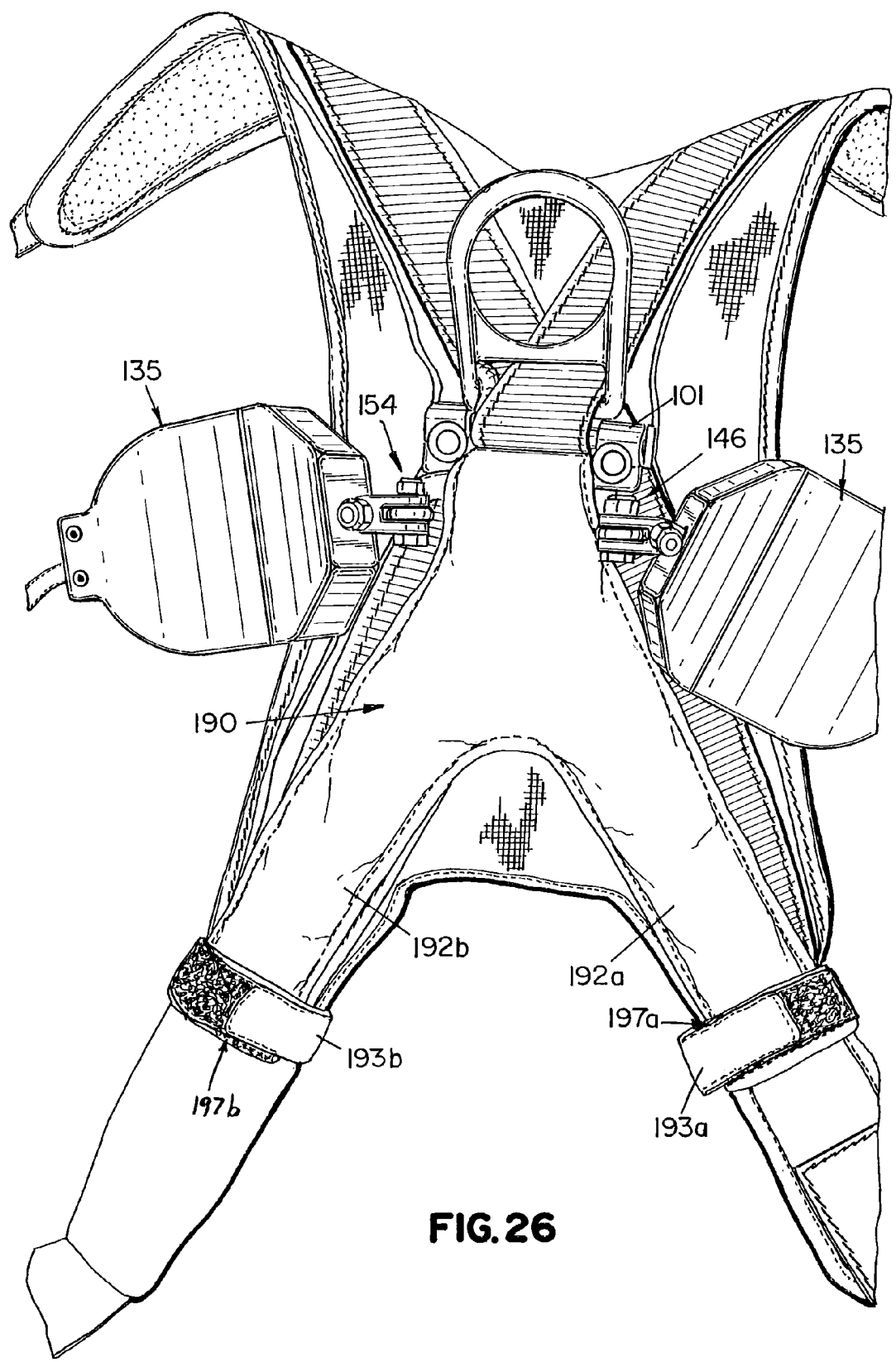
FIG. 26 is a front view of another embodiment energy absorber assembly operatively connected to a safety harness and two self-retracting lifelines.
Figure 27:
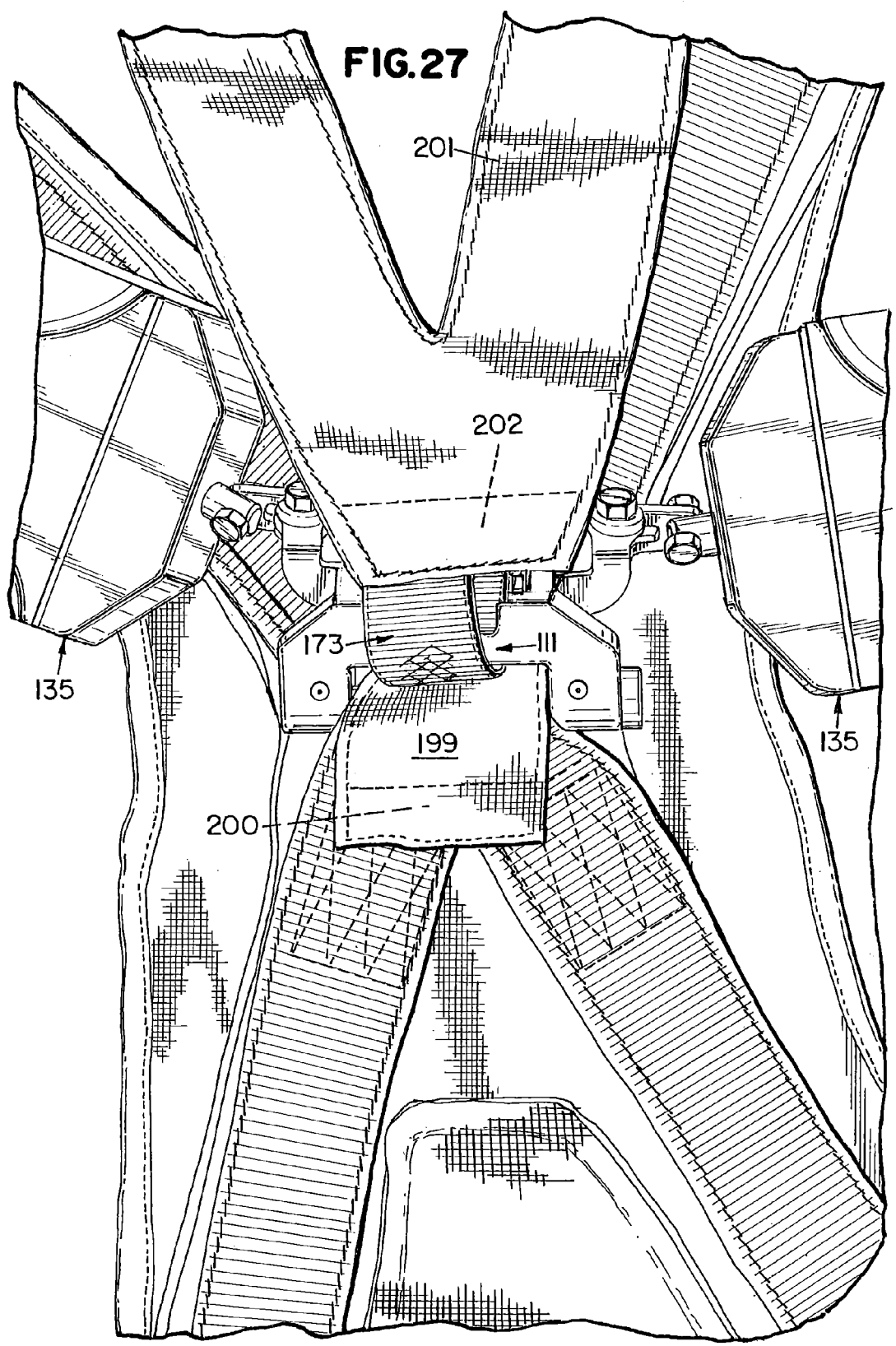
FIG. 27 is a rear view of a cover of the energy absorber assembly shown in FIG. 26.

To put the cover 190 on the energy absorber 170, the first side 179 is inserted through the opening 203 and in the cavity 204 proximate the first leg 192a and the second side 180 is inserted through the opening and in the cavity 204 proximate the second leg 192b. The sides 179 and 180 may be positioned in the cavity 204 in any order and even substantially simultaneously. Then, the top portion 191 is inserted through the slot 110 of the connector 101, as shown in FIG. 27, so that it can be inserted through the opening 204 and the fasteners 200 and 202 mate. The straps 193a and 193b are wrapped around the shoulder straps of the safety harness and the ends of the respective straps are connected as shown in FIG. 26.

Should a fall occur, the fastener 168 deforms or breaks so that the bracket assembly 120 disconnects from the connector 101, the top portion 191 of the cover 190 disconnects from the rear side 201, and the portions 171 and 172 of the energy absorber 170 begin to separate and come out of the cover 190 thereby reducing the rate of fall and the amount of force exerted on the user from the fall. Depending upon the distance of the fall, varying lengths of the portions 171 and 172 could separate.

Another embodiment energy absorber assembly 100' is similar to the energy absorber assembly 100 except that it includes a bracket assembly 140 for connecting two self-retracting lifelines 135 to the connector 101. Because the energy absorber assembly 100' is similar to the energy absorber assembly 100, only significant differences will be described in detail.

Figure 9:
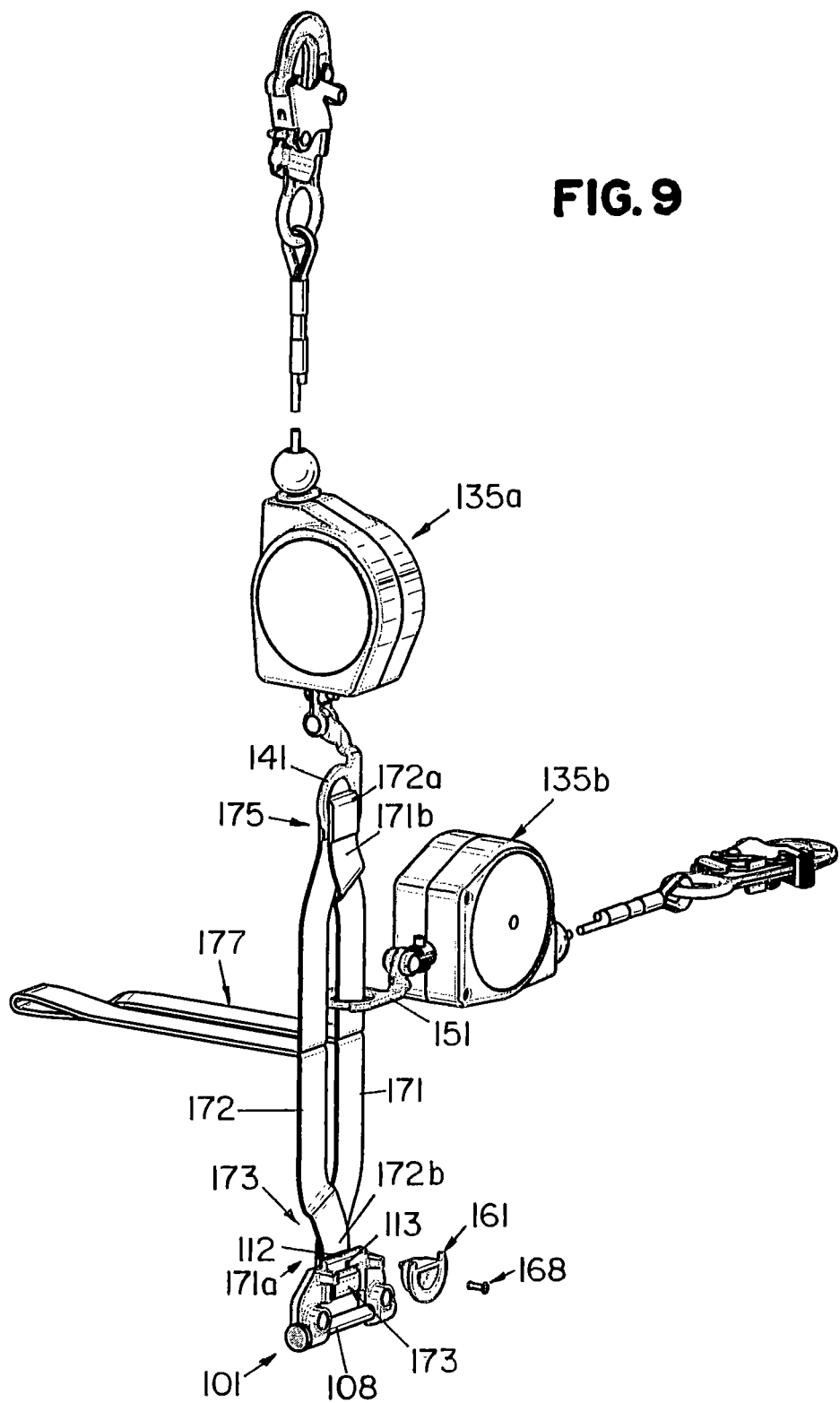
FIG. 9 is a front perspective view of the energy absorber assembly shown in FIG. 7 illustrating an energy absorbing position.

As shown in at least FIGS. 7-9, the bracket assembly 140 includes a first circular base 141 configured and arranged to operatively connect to a first self-retracting lifeline 135 and a second circular base 151 configured and arranged to operatively connect to a second self-retracting lifeline 135.

The first circular base 141, shown in at least FIGS. 17 and 18, is generally ring-like and includes an aperture 142. A first side 143 of the base 141 includes a protrusion 144 extending outward proximate the top, and a second side 145 of the base 141 includes a first swivel connector portion 146 extending outward proximate the top. The first swivel connector portion 146 includes a stationary portion 147, which includes an extension arm 147a and a flange 147b having an aperture 147c. Rather than extending inward in a U-shaped manner like the stationary portion 126 of the bracket assembly 120, the stationary portion 147 extends outward as shown in FIG. 18. A swivel portion 148 is operatively connected to the flange 147b similarly as the swivel portion 127 is operatively connected to the flange 126b. The swivel portion 148 includes an aperture 149 for connecting a self-retracting lifeline 135 thereto as is well known in the art.

The second circular base 151, shown in at least FIGS. 19A and 19B, is generally a mirror image of the first circular base 141. The second circular base 151 is generally ring-like and includes an aperture 152. A first side 153 of the base 151 includes a second swivel connector portion 154 extending outward proximate the top, and a second side 158 of the base 151 includes a protrusion 159 extending outward proximate the top. The second swivel connector portion 154 includes a stationary portion 155 and a swivel portion 156, which are similar to those of the first swivel connector portion 146. The swivel portion 156 includes an aperture 157 for connecting a self-retracting lifeline 135 thereto as is well known in the art.

A base connector 161, shown in at least FIGS. 20-24, is configured and arranged to operatively connect the circular bases 141 and 151 to the connector 101. The base connector 161 is preferably made of nylon. The base connector 161 includes a generally cylindrical portion 162 to which a plate portion 163 is operatively connected proximate one side and a flange portion 165 is operatively connected proximate an opposing side. The plate portion 163 includes an aperture 164 proximate the center of the cylindrical portion 162. A segment is removed from the cylindrical portion 162 to form a bottom 166, which includes an extension 166a extending outward from the plate portion 163. An opening 167 is formed by the flange portion 165 and the bottom 166.

The circular bases 141 and 151, which are preferably made of alloy steel, are positioned together with the swivel connector portions 146 and 154 extending outward from opposing sides and the apertures 142 and 152 aligning. The base connector 161 is inserted through the apertures 142 and 152 so that the ring portions are proximate the cylindrical portion 162. A fastener 168 extends through the aperture 164 and the aperture 113 to connect the base connector 161 to the connector 101. The extension 166a of the base connector 161 is positioned below the second bar portion 112 of the connector 101 to prevent the base connector 161 from pivoting relative to the connector 101. Therefore, the circular bases 141 and 151 are positioned between the connector 101 and the flange portion 165. The circular bases 141 and 151 pivot independently relative to the connector 101 and the base connector 161, and the swivel connector portions 146 and 154 and the protrusions (shoulder portions) 144 and 159 contact the respective protrusions 114 and 115, which act likes stops to limit rotation of the circular bases 141 and 151.

Similar to the bracket assembly 120, the energy absorber 170 is connected to the bracket assembly 140 by inserting one of the second end 171b of the first portion 171 and the first end 172a of the second portion 172 through the apertures 142 and 152 from one side of the circular bases 141 and 151, the other of the second end 171b of the first portion 171 and the first end 172a of the second portion 172 is positioned proximate the other side of the circular bases 141 and 151, and the ends 171b and 172a are operatively connected, such as by stitching, as a second connection 175 to form a second loop 176 about the ring portions of the bases 141 and 151. The energy absorber 170 may be connected to the bracket assembly 140 before the base connector 161 is inserted through the apertures 142 and 152 or after the base connector is inserted through the apertures 142 and 152 and connected to the connector 101.

Should a fall occur, the fastener 168 deforms or breaks so that the base connector 161 disconnects from the connector 101 thereby releasing the circular bases 141 and 151 from the connector, the top portion 191 of the cover 190 disconnects from the rear side 201, and the portions 171 and 172 of the energy absorber 170 begin to separate and come out of the cover 190 thereby reducing the rate of fall and the amount of force exerted on the user from the fall. Depending upon the distance of the fall, varying lengths of the portions 171 and 172 could separate.

FIG. 9 illustrates how the circular bases 141 and 151 may be positioned during a fall. The connector 101 is operatively connected to the user's safety harness, and the first self-retracting lifeline 135a is operatively connected to a support structure. As the portions 171 and 172 of the energy absorber 170 separate, the second self-retracting lifeline 135b simply slides along a portion of the energy absorber 170 as the portions 171 and 172 continue to separate. If the second self-retracting lifeline 135b were connected to a support structure, the first self-retracting lifeline would similarly slide along a portion of the energy absorber 170 as the portions 171 and 172 separate.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. A bracket assembly configured and arranged to be operatively connected to a safety harness, comprising:
   a base;
   a first flange portion operatively connected to the base, the first flange portion including a first flange aperture;
   a swivel portion including a first leg portion and a second leg portion extending outward from a second flange portion, the first leg portion having a first leg aperture, the second leg portion having a second leg aperture, the second flange portion having a second flange aperture, the first leg portion and the second leg portion defining a first opening therebetween, the first opening receiving the first flange portion, the first flange aperture, the first leg aperture, and the second leg aperture aligning;

a first fastener extending through the first flange aperture, the first leg aperture, and the second leg aperture, the swivel portion pivoting about the first fastener in a first direction relative to the first flange portion;

a safety device connector including a safety device connector aperture;

a second fastener extending through the safety device connector aperture and the second flange aperture, the safety device connector pivoting about the second fastener in a second direction opposite the first direction relative to the second flange portion; and a safety harness connector configured and arranged to be operatively connected to the safety harness, the base being operatively connected to the safety harness connector, a third fastener interconnecting the base and the safety harness connector, the base pivoting about the third fastener in a third direction relative to the safety harness connector.

2. The bracket assembly of claim 1, wherein the safety device connector has a first prong and a second prong defining a second opening therebetween, the first prong having a first prong aperture, the second prong having a second prong aperture, the second opening receiving the second flange portion and the first prong aperture, the second prong aperture, and the second flange aperture aligning, the second fastener extending through the first prong aperture, the second prong aperture, and the second flange aperture.

3. The bracket assembly of claim 1, further comprising a safety device including the safety device connector, the safety device being moveable in any of the first, second, and third directions.

4. The bracket assembly of claim 1, wherein the base includes a first base, a second base, and a base connector, each of the first and second bases pivoting independently in a third direction relative to the base connector.

5. The bracket assembly of claim 1, further comprising a safety device including the safety device connector, the safety device being moveable in any of the first, second, and third directions.

6. A bracket assembly configured and arranged to be operatively connected to a safety harness, comprising:
 a base;
 a first flange portion operatively connected to the base, the first flange portion including a first flange aperture;
 a swivel portion including a first leg portion and a second leg portion extending outward from a second flange portion, the first leg portion having a first leg aperture, the second leg portion having a second leg aperture, the second flange portion having a second flange aperture, the first leg portion and the second leg portion defining a first opening therebetween, the first opening receiving the first flange portion, the first flange aperture, the first leg aperture, and the second leg aperture aligning;
 a first fastener extending through the first flange aperture, the first leg aperture, and the second leg aperture, the swivel portion pivoting about the first fastener in a first direction relative to the first flange portion;
 a safety device connector having a first prong and a second prong defining a second opening therebetween, the first prong having a first prong aperture, the second prong having a second prong aperture, the second opening receiving the second flange portion, the first prong aperture, the second prong aperture, and the second flange aperture aligning;
 a second fastener extending through the first prong aperture, the second prong aperture, and the second flange aperture, the safety device connector pivoting about the second fastener in a second direction opposite the first direction relative to the second flange portion; and
 a safety harness connector configured and arranged to be operatively connected to the safety harness, the base being operatively connected to the safety harness connector, a third fastener interconnecting the base and the safety harness connector, the base pivoting about the third fastener in a third direction relative to the safety harness connector.

7. The bracket assembly of claim 6, further comprising a safety device including the safety device connector, the safety device being moveable in any of the first, second, and third directions.

8. The bracket assembly of claim 6, wherein the base includes a first base, a second base, and a base connector, each of the first and second bases pivoting independently in a third direction relative to the base connector.

9. The bracket assembly of claim 6, further comprising a safety device including the safety device connector, the safety device being moveable in any of the first, second, and third directions.

10. A bracket assembly configured and arranged to be operatively connected to a safety harness, comprising:
 a base including a first base, a second base, and a base connector;
 a first flange portion operatively connected to the base, the first flange portion including a first flange aperture;
 a swivel portion including a first leg portion and a second leg portion extending outward from a second flange portion, the first leg portion having a first leg aperture, the second leg portion having a second leg aperture, the second flange portion having a second flange aperture, the first leg portion and the second leg portion defining a first opening therebetween, the first opening receiving the first flange portion, the first flange aperture, the first leg aperture, and the second leg aperture aligning;
 a first fastener extending through the first flange aperture, the first leg aperture, and the second leg aperture, the swivel portion pivoting about the first fastener in a first direction relative to the first flange portion;
 a safety device connector including a safety device connector aperture;
 a second fastener extending through the safety device connector aperture and the second flange aperture, the safety device connector pivoting about the second fastener in a second direction opposite the first direction relative to the second flange portion;
 each of the first and second bases pivoting independently in a third direction relative to the base connector; and
 safety harness connector configured and arranged to be operatively connected to the safety harness, a third fastener interconnecting the base connector and the safety harness connector.

11. The bracket assembly of claim 10, further comprising a safety device including the safety device connector, the safety device being moveable in any of the first, second, and third directions.

* * * * *